United States Patent
Tu et al.

(10) Patent No.: US 8,719,482 B2
(45) Date of Patent: May 6, 2014

(54) ELECTRONIC DEVICE WITH BUS SHARING FUNCTION

(75) Inventors: Wen-Chong Tu, Shenzhen (CN); Wei Shao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 178 days.

(21) Appl. No.: 13/459,097

(22) Filed: Apr. 28, 2012

(65) Prior Publication Data

US 2013/0227189 A1 Aug. 29, 2013

(30) Foreign Application Priority Data

Feb. 27, 2012 (CN) .......................... 2012 1 0045392

(51) Int. Cl.
*G06F 13/14* (2006.01)
(52) U.S. Cl.
USPC .......................................... 710/305; 370/370

(58) Field of Classification Search
USPC ........... 710/305–306, 5, 33; 714/42; 370/360, 370/370
See application file for complete search history.

(56) References Cited

U.S. PATENT DOCUMENTS 6,292,855 B1 * 9/2001 Johnson et al. ................. 710/33

* cited by examiner

*Primary Examiner* — Clifford Knoll
(74) *Attorney, Agent, or Firm* — Novak Druce Connolly Bove + Quigg LLP

(57) ABSTRACT

A electronic device includes a bus, two electronic elements connected to the bus, and a controller. Each of the two electronic element is designated a logic unit number (LUN) and a first temporary buffer identified by the LUN for storing messages transmitted from or to the corresponding electronic element by the bus. The controller for obtaining the LUN of the message transmitted from/to the at least two electronic element, determining the temporary buffer which the message is stored according to the obtained LUN, storing the message to the determined temporary buffer, and transmitting the message stored in the temporary buffer to the corresponding electronic element or processing the message stored in the temporary buffer.

7 Claims, 2 Drawing Sheets

ELECTRONIC DEVICE WITH BUS SHARING FUNCTION

BACKGROUND

1. Technical Field

The present disclosure relates to an electronic device in which a bus is shared by different elements of the electronic device.

2. Description of Related Art

A baseboard management controller (BMC) of a server connects input devices by an intelligent platform management bus (IPMB) and responds to input of user to control the baseboard of the server. The BMC also can communicate with a firmware by the IPMB to obtain data, such as CPU temperature, storage temperature, or south-bridge temperature, sensed by sensors which are governed by the firmware. However, when the IPMB is shared by the input device and the firmware, the communication between the firmware and the BMC will interfere with the communication between the electronic device and BMC, which results in errors.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
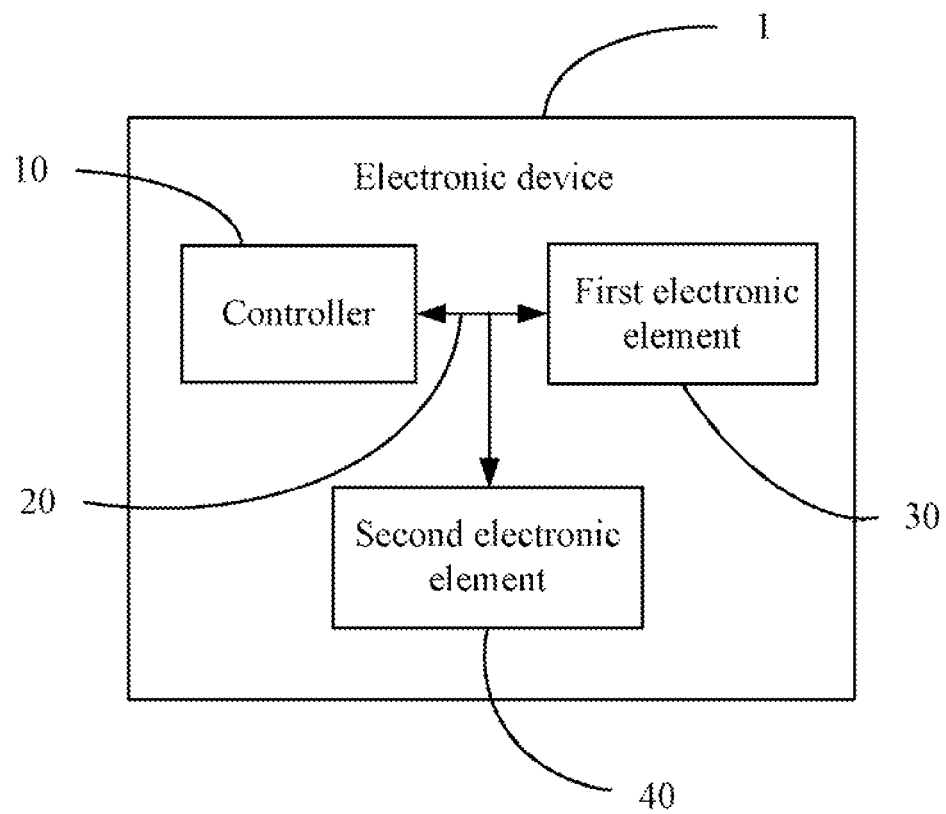
FIG. 1 is a block diagram of an electronic device for sharing a communication bus in accordance with an exemplary embodiment.

FIG. 1 is a block diagram of an electronic device 1 with a bus sharing function. The electronic device 1 includes a controller 10, a bus 20, and a first electronic element 30. The controller 10 connects to the first electronic element 30 by means of the bus 20. In the embodiment, the electronic device 1 is a server, the controller 10 is a baseboard management controller (BMC), and the bus 20 is an intelligent platform management bus (IPMB) IPMB. The first electronic element 30 is an input device of the electronic device 1 and is for receiving user input and transmitting the input to the controller 10 by the bus 20. The first electronic element 30 has a designated logic unit number (LUN) and a first temporary buffer identified by the LUN for storing messages transmitting from or to the first electronic element 30.

The bus 20 further connects to a second electronic element 40 which is an inner element of the electronic device 1, such as a firmware. The second electronic element 40 connects to a number of sensors (not shown) which are for sensing the states or characteristics of some elements of the electronic device, such as CPU temperature, storage temperature, and south-bridge temperature. The BMC communicates with the second electronic element 40 to obtain the data from the sensing of the elements of the electronic device 1.

The controller 10 sets another LUN for the second electronic element 40 and designates a second temporary buffer identified by the other LUN for storing messages transmitting from or to the second electronic element 40. When a message needing to be transmitted is generated, the controller 10 obtains the LUN of the message, determines the temporary buffer which the message is to be stored according to the obtained LUN, and stores the message to the determined temporary buffer. The controller 10 transmits the message to the corresponding electronic element according to the obtained LUN. When a message transmitted from the electronic element (30 or 40) is received, the controller 10 determines the temporary buffer which the message is to be stored according to the obtained LUN, stores the message to the determined temporary buffer, and processes the message stored in the temporary buffer.

Figure 2:
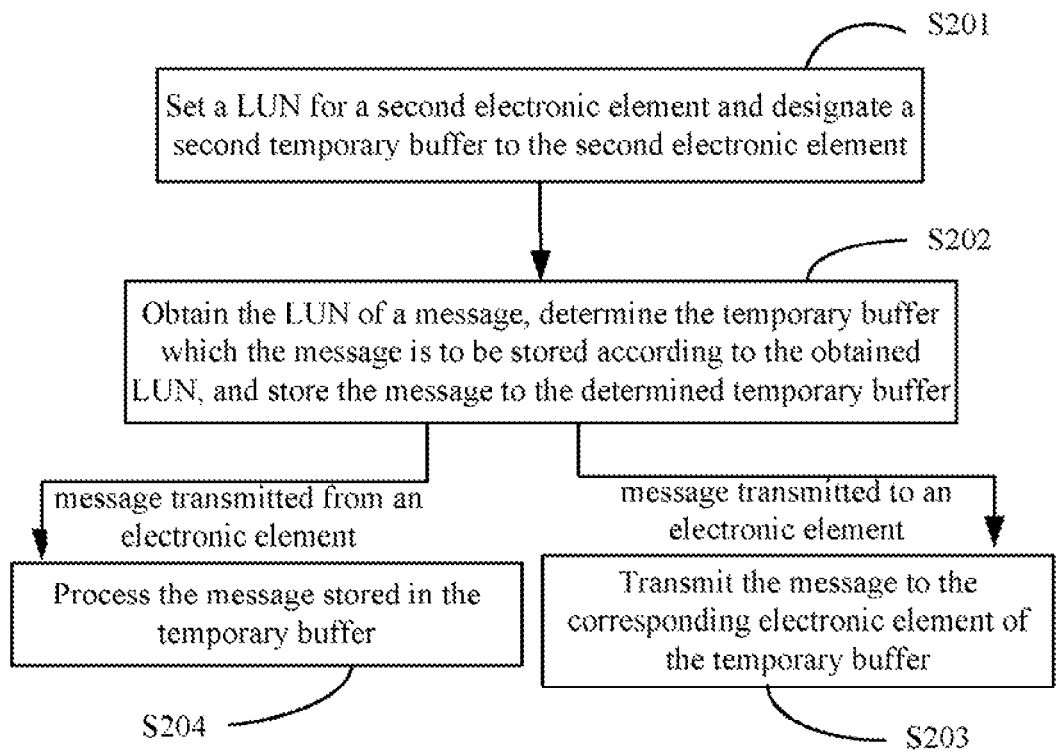
FIG. 2 is flowchart of a method for sharing a communication bus of the electronic device of FIG. 1.

FIG. 2 is a flowchart of a method for sharing the bus 20 of the electronic device. In step S201, the controller 10 sets a LUN for a second electronic element 40 and designates a second temporary buffer to the second electronic element 40.

In step S202, the controller 10 obtains the LUN of a message, determines the temporary buffer in which the message is to be stored according to the obtained LUN, and stores the message to the determined temporary buffer.

In step S203, if the message is a message needed to be transmitted to an electronic element, the controller 10 transmits the message to the corresponding electronic element of the temporary buffer.

In step S204, if the message is a message transmitted from an electronic element, the controller 10 processes the message stored in the temporary buffer.

Although the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An electronic device comprising:
    a bus;
    at least two electronic elements connected to the bus, wherein each of the at least two electronic elements is designated a logic unit number (LUN) and a temporary buffer identified by the LUN for storing messages transmitted from or to the corresponding electronic element by the bus; and
    a controller for obtaining the LUN of the message transmitted from/to the at least two electronic elements, determining one of the at least two temporary buffers in which the message is to be stored according to the obtained LUN, storing the message to said on temporary buffer, and transmitting the message stored in said one temporary buffer to the corresponding electronic element or processing the message stored in said one temporary buffer.

2. The electronic device as described in claim 1, wherein the electronic device is a server, the controller is a baseboard management controller (BMC), and the bus is an intelligent platform management bus (IPMB).

3. The electronic device as described in claim 1, wherein the number of the at least two electronic elements is two, one is an input device of the electronic device and the other is a firmware of the electronic device.

4. The electronic device as described in claim 3, wherein the firmware connects a number of sensors which are for sensing parameters of some elements of the electronic device and the controller communicate with the firmware to obtain parameters of some elements of the electronic device.

5. A method for sharing a bus which connects at least two electronic elements, comprising:
    designating a logic unit number (LUN) and a first temporary buffer to each of the at least two electronic elements, wherein the first temporary buffer is identified by the LUN for storing messages transmitted from or to the corresponding electronic element by the bus;

obtaining the LUN of the message transmitted from or to the at least two electronic elements;

determining one of the at least two temporary buffers in which the message is to be stored according to the obtained LUN;

storing the message to said one temporary buffer; and transmitting the message stored in said one temporary buffer to the corresponding electronic element of said one temporary buffer or processing the message stored in said one temporary buffer.

6. The method as described in claim 5, wherein the number of the at least two electronic elements is two, one is an input device of the electronic device and the other is a firmware of the electronic device.

7. The method as described in claim 6, wherein the firmware connects a number of sensors which are for sensing parameters of some elements of the electronic device and the controller communicate with the firmware to obtain parameters of some elements of the electronic device.

* * * * *